(12) United States Patent
Lu et al.

(10) Patent No.: US 9,764,284 B2
(45) Date of Patent: Sep. 19, 2017

(54) LOW PRESSURE DROP EXTRUDED CATALYST FILTER

(71) Applicant: Corning Incorporated, Corning, NY (US)

(72) Inventors: Yanxia Ann Lu, Painted Post, NY (US); Steven Bolaji Ogunwumi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 181 days.

(21) Appl. No.: 13/863,673

(22) Filed: Apr. 16, 2013

(65) Prior Publication Data

US 2013/0224091 A1    Aug. 29, 2013

Related U.S. Application Data

(62) Division of application No. 13/024,500, filed on Feb. 10, 2011, now Pat. No. 8,440,586.

(60) Provisional application No. 61/308,708, filed on Feb. 26, 2010.

(51) Int. Cl.

| | | |
|---|---|---|
| *B01D 53/94* | (2006.01) | |
| *B01J 35/04* | (2006.01) | |
| *B01J 29/72* | (2006.01) | |
| *B01J 37/00* | (2006.01) | |
| *B01J 37/04* | (2006.01) | |
| *B82Y 30/00* | (2011.01) | |

(52) U.S. Cl.
CPC .......... *B01D 53/94* (2013.01); *B01J 29/7215* (2013.01); *B01J 35/04* (2013.01); *B01J 37/0009* (2013.01); *B01J 37/0018* (2013.01); *B01J 37/04* (2013.01); *B82Y 30/00* (2013.01); *B01D 2255/20738* (2013.01); *B01D 2255/50* (2013.01); *B01D 2255/9155* (2013.01); *B01D 2257/404* (2013.01)

(58) Field of Classification Search
None
See application file for complete search history.

(56) References Cited

U.S. PATENT DOCUMENTS

| | | | |
|---|---|---|---|
| 6,284,680 B1* | 9/2001 | Aikawa et al. | 442/363 |
| 7,445,745 B2 | 11/2008 | Peterson | |
| 7,582,583 B2* | 9/2009 | Bosch et al. | 502/63 |
| 7,981,375 B2* | 7/2011 | Ramberg | B01D 53/02 |
| | | | 264/628 |
| 8,440,586 B2 | 5/2013 | Lu et al. | |
| 2004/0236106 A1* | 11/2004 | Frauenkron et al. | 544/352 |
| 2007/0071666 A1* | 3/2007 | Larsen | B01J 29/035 |
| | | | 423/351 |
| 2007/0110645 A1* | 5/2007 | Zuberi et al. | 422/211 |
| 2008/0202107 A1* | 8/2008 | Boorse et al. | 60/301 |
| 2009/0048095 A1* | 2/2009 | Li | B01D 53/8628 |
| | | | 502/74 |
| 2009/0143221 A1* | 6/2009 | Ogunwumi | B01D 53/944 |
| | | | 502/67 |
| 2010/0126132 A1* | 5/2010 | Merkel | 55/523 |
| 2010/0247411 A1 | 9/2010 | Larcher et al. | |

FOREIGN PATENT DOCUMENTS

WO    99/32844    7/1999

OTHER PUBLICATIONS

M. M. Rahman et al., "Synthesis of γ-Fe2O3 by Thermal Ecomposition of Ferrous Gluconate Dihydrate", Journal of Thermal Analysis and Calorimetry, vol. 68 (2002) 91-101.

* cited by examiner

*Primary Examiner* — Melvin C Mayes
*Assistant Examiner* — Sheng H Davis
(74) *Attorney, Agent, or Firm* — John L. Haack

(57) ABSTRACT

A batch composition for making a highly porous honeycomb ceramic catalytic filter article, including base inorganic components including a mixture of a nano-zeolite powder, and an inorganic filler, in amounts defined herein; and super additives including: a mixture of at least two pore formers; a binder; and a metal salt, in amounts defined herein. Also disclosed are extruded catalyst filter articles and methods for making the articles.

6 Claims, 2 Drawing Sheets

LOW PRESSURE DROP EXTRUDED CATALYST FILTER

CLAIMING BENEFIT OF PRIOR FILED U.S. APPLICATION

This application is a divisional of U.S. patent application Ser. No. 13/024,500, filed on Feb. 10, 2011, now U.S. Pat. No. 8,440,586, which claims the benefit of U.S. Provisional Ser. No. 61/308,708, filed on Feb. 26, 2010. The entire disclosure of any publication or patent document mentioned herein is incorporated by reference.

FIELD

The disclosure relates generally to high porosity ceramic catalytic filter articles and to a method for pore size control in the ceramic filter article.

SUMMARY

The disclosure provides batch compositions, high porosity ceramic catalytic filter articles thereof, and methods of manufacturer and use of the compositions and the articles. The batch compositions, which include mixtures of pore formers, provide highly-porous, low pressure-drop filter articles after extrusion and firing.

BRIEF DESCRIPTION OF THE DRAWING(S)

In embodiments of the disclosure:

DETAILED DESCRIPTION

Figure 1A:
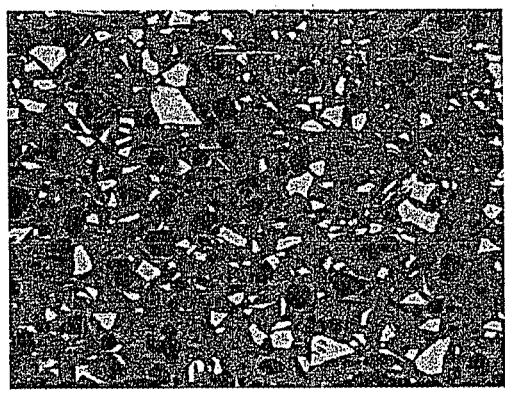
FIGS. 1A to 1C show images of microstructures of exemplary zeolite filter articles prepared with selected pore formers.

Various embodiments of the disclosure will be described in detail with reference to drawings, if any. Reference to various embodiments does not limit the scope of the invention, which is limited only by the scope of the claims attached hereto.

Additionally, any examples set forth in this specification are not limiting and merely set forth some of the many possible embodiments for the claimed invention.

Definitions

"Permeability," and like terms, generally refer to a measure of the ability of a fluid to flow through the pores or interstices of a material. The property described here is the intrinsic permeability which depends on the properties of the medium (porous ECF). According to Darcy's law, flow of fluids (including gas) through porous media is proportional to the pressure gradient causing flow. The Darcy permeability constant can be used to express the permeability of an ECF article, and is given by:

$$K = \frac{8FTV}{\pi D^2 (p^2 - 1)}$$

where K is permeability ($cm^2$), F is flow rate (cc/sec), T is thickness, V is the viscosity, D is the sample diameter, P is the pressure (atm). The Darcy permeability constant is $K/(9.87 \times 10^{-9} \, cm^2)$ since one Darcy is equal to $9.87 \times 10^{-9} \, cm^2$. A high Darcy permeability constant means easier flow through the porous body, which will lower the pressure drop.

"Porosity," and like terms generally refer to the total void space in a honeycomb material that can be attributed to the presence of pores and excludes the void space in a honeycomb material attributable to the presence of macroscopic channels or vias of the honeycomb, or the ratio of the pore volume to the total volume of a pulverized solid material, and may be expressed as percent porosity (%P). Porosity, and like characteristics of the ceramic bodies are mentioned in commonly owned and assigned U.S. Pat. No. 6,864,198. Such parameters as $d_{10}$, $d_{50}$ and $d_{90}$ relate to the pore size distribution. The quantity $d_{50}$ is the median pore size based upon pore volume, and is measured in micrometers; thus, $d_{50}$ is the pore diameter at which 50% of the open porosity of the ceramic has been intruded by mercury. The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of micrometers. The quantity $(d_{50} - d_{10}/d_{50})$ describes the width of the distribution of pore sizes finer than the median pore size, $d_{50}$. Porosities were obtained using mercury porosimetry.

"Super additive," "super addition," and like terms generally refer to adding additional ingredients or materials to a batch composition or like formulation in excess of, or in addition to, a 100 wt % base inorganics formulation. A base formulation totaling 100 wt % can be, for example, a combination of nano-zeolite in an amount from 20 to 80 weight percent and an inorganic filler material in an amount from 80 to 20 weight percent, and the super additives can be a mixture of pore formers, with or without other super additives, and can be present or added to the batch in, for example, from about 50 to about 300 wt % in addition to the base formulation 100 wt %.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, that may be employed in describing the embodiments of the disclosure, refers to variation in the numerical quantity that can occur, for example: through typical measuring and handling procedures used for making the ceramic compositions, and articles; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Consisting essentially of" in embodiments refers, for example, to a green body and ceramic compositions, to a method of making or using the green body and ceramic compositions, or formulation, and articles, devices, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular pore former, a particular filler, or particular condition, or like structure, material, or process variable selected. Items that may materially affect the basic properties of the components or steps of the disclosure or that may impart undesirable characteristics to the present disclosure include, for example, excessive departures from the disclosed batch compositions, preparative processes, and like aspects.

The indefinite article "a" or "an" and its corresponding definite article "the" as used herein means at least one, or one or more, unless specified otherwise.

Specific and preferred values disclosed for components, ingredients, additives, times, temperatures, and like aspects, and ranges thereof, are for illustration only; they do not exclude other defined values or other values within defined ranges. The compositions and methods of the disclosure include those having any value or any combination of the values, specific values, more specific values, and preferred values described herein.

Variation in raw materials, such as inorganic species, particle size, and particle morphology, is known to impact porosity and pore size distribution of ceramic and related fired articles. The porosity property can also be modified using pore former additives, such as graphite, organic starches, polymers, and like materials, or mixtures thereof Pore formers have been used in diesel filter product manufacture, such as aluminum titanate (AT), cordierite, and silicon carbide (SiC) compositions. For example, U.S. Pat. No. 7,445,745, entitled "Method for Fabricating Ceramic Articles," mentions batch components having a pore former. WO 9932844 entitled "Method for Firing Ceramic Honeycomb Bodies and a Tunnel Kiln Used Therefor" mentions a method of firing cellular ceramic bodies, and to a tunnel kiln adapted for such a firing method.

An integrated exhaust after-treatment method for NOx and soot could reduce the filter components of the system and potentially offer a back pressure reduction resulting in fuel savings. The method could also offer possible space savings and potential reduction in catalyst loading which may also provide cost savings. Additional size reduction or number reduction of after-treatment components may also provide weight reduction, which can represent further fuel savings.

Highly porous filters coated with a catalyst to achieve selective catalytic reduction (SCR) are highly challenging to manufacture. Challenges associated with coated high porosity filters include, for example: higher back pressure upon catalyst loading; limitations on catalyst loading to avoid the back pressure penalty; potential catalyst erosion issues; non-uniform catalyst coatings; and interaction of the catalyst and the support materials leading to decreased catalyst performance, and increased weight of the support material. Non-uniform coating can lead to poor soot filtration efficiency.

In embodiments, the present disclosure overcomes one or more of the challenges of a high porosity catalyzed filter mentioned in the preceding paragraph. The disclosure also provides a method for achieving a low back pressure for an extruded catalyst filter.

In embodiments, the disclosure provides a method of making an extruded catalyst filter body having a geometry that provides a low back pressure at high soot loading and maintains significant NOx reduction activity, for example, low back pressure extruded catalyzed filters can be made with a geometry configuration having about 100 cells per square inch (cpsi) to about 400 cpsi, such as 200 cpsi to about 400 cpsi, including intermediate values and ranges. The wall thickness can be from about 10 mils to about 12 mils, or from 7 to 10 mils, including intermediate values and ranges, for engine exhaust gas particulate filter applications.

To achieve even lower back pressure reduction, a lower cell density, a thinner wall, or both, can be provided. A particularly useful honeycomb geometry can be, for example, a 200 to 300 cpsi having a wall thickness lower than about 12 mils. A particularly useful wall thickness is from about 7 to about 10 mils. Accordingly, an exemplary geometry of particular usefulness can be a 300 cpsi with an 8 mil wall thickness (i.e., that is 300/8 geometry).

For high surface area materials, such as materials having a surface area greater than about 200 $m^2/g$, or nano materials, such as zeolite, γ-alumina, or carbon black, it is difficult to make large pores, for example in the micron range, even with the addition of micron sized pore formers. The nano-particles, such as those having a particle size of about 1 to about 1,000 nm, tend to surround the pores that are created by pore formers. The connections (interstices) between the pores can be blocked by the nano-particles. Thus, a significant aspect of the disclosed composition and methods of use is to have or maintain open connections between pores.

Pore formers are commonly used to make porous ceramics. The two major types of pore formers are organic pore formers and inorganic pore formers. The most common inorganic pore former is carbon graphite, which can be burned out of the honeycomb matrix at about 600° C. to about 900° C. The organic pore formers can include, for example, a variety of starches, polyethylene, or any organic substance that can also be burned out of the honeycomb matrix at elevated temperatures. Since starches are inexpensive natural materials, they have become very popular pore formers in ceramic manufacture.

Generally, most ceramic powders have a particle size in the range of several microns or larger and the green (unfired) material compaction is low prior to sintering. Therefore, only a small quantity of pore former may be needed to make a porous body having a porosity of 50% or above. For instance, cordierite particulate filters typically can contain from about 10 to about 30 wt % pore formers in the green batch, which can produce a porosity of about 50% in the fired body (see, from example, commonly owned and assigned U.S. Ser. No. 12/423,272, entitled "Low Thermal Mass Cordierite Compositions for Auto and Diesel Substrate Applications"). By matching inorganic raw materials and organic pore formers, the pore size distribution can be very narrow and pore connectivity can be high. However, for a nano-ceramic powder, such as zeolite containing filters, the pore connectivity is low even at very high pore former content because the nano-powder may tend to form walls around pores. Although the pores are large, they lack adequate interconnection on a microscopic level. Such a porous body is unsuitable for a filtration application. In commonly owned and assigned U.S. Ser. No. 12/275,568, entitled "Zeolite-Based Honeycomb Body," (now US2009/0143221) there is disclosed a method to make agglomerates of zeolites with fillers, then adding pore formers to form large pores. The honeycombs disclosed had a median pore size of about 4 to about 18 micrometers and porosity of about 50%.

In embodiments, the disclosure provides compositions, filter articles, and methods for making and using the filter articles having low pressure drop properties.

The filter articles can be useful for various filter applications including, for example, selective catalytic reduction (SCR) or a four-way Diesel Particulate NOx Reduction (DPNR) which is an integrated approach for nitrogen oxides and particulate matter (NOx/PM) reduction.

In embodiments, the compositions and methods of the disclosure can use nano-zeolite raw materials to achieve or maintain high surface area and catalytic activity, and to resolve pore connectivity issues by using multiple pore formers in combination with micron sized inorganic fillers.

In embodiments, the disclosure provides an extruded catalyst filter body having a low back pressure property of less than about 5 Kpa at from about 5 grams/liter to about 7 grams/liter soot loading, such as in an extruded catalyst filter body having a 300/8 geometry and 8.35 cfm/in² flow rate (i.e., the highest face velocity for this geometry). The body is capable of greater than about 70% NOx reduction activity via ammonia-SCR above 300° C. after durability aging at 700° C. for 64 hrs in 10% moisture. The body also exhibits greater than about 50% NOx conversion at 300 ° C. or below. The disclosed filter body has a Darcy permeability of about 0.2 and a narrow pore size distribution, as measured by $d_{breadth}$ ($d_{breath}=(d_{90}-d_{10})/d_{50}$) of less than about 1.5, that provides the low back pressure property improvement compared to known catalyst wash coat compositions on a high porosity filter. In embodiments, the disclosure provides a method of making filters having reduced steps, and eliminates material handling and process machinery. Another particularly useful aspect of the disclosure includes a reduction in process manipulations to a single extrusion step. The disclosure also provides a method for selecting a pore former package to enhance the pore connectivity for the disclosed nano-catalyst materials.

The disclosed articles and methods provide high NOx conversion as demonstrated herein. The articles of the disclosure exhibit a significant back pressure reduction property when prepared with a thinner web extrusion die, such as the above mentioned 300/8 geometry. Filter articles produced with a thinner web also significantly reduce the fuel penalty. The disclosure provides a method to improve the pore connectivity within fired honeycomb bodies by selecting different types of pore formers for formulating the batch composition. The nano-ceramic porous body can be prepared in a single step by extrusion to provide so-called extruded catalyst filters (ECF). The batch compositions can include, for example: a nano-zeolite powder (such as from Zeolyst International; zeolyst.com) having a surface area of above about 200 m²/g to above about 400 m²/g, an inorganic filler having a median particle size of about 10 to about 30 micrometers, and the mixture of pore formers having a median particle size from about 6 micrometers to about 50 micrometers. The batches can also contain other additives, for example, an organic binder, such as methylcellulose, an inorganic binder, such as a silicone emulsion, or metal oxide catalyst such as iron oxide or an iron compound. The honeycomb body filter precursor (green body) can be fired for about 3 hours or more at, for example, about 650 to about 1,000° C., or about 700 to about 850° C. After firing, the ECF can contain an ion impregnated or metal ion (e.g., iron) exchanged zeolite as the active component in an amount of from about 20 wt % to about 60 wt % arising from the interaction of the nano-zeolite and the metal salt. In embodiments, the zeolite can be exchanged with the metal ion prior to formulating the batch composition, that is, pre-exchanged (vs. in situ exchange during batching). The zeolite can be exchanged with the metal ion in, for example, a weight ratio of from about 10:1 to about 15:1. The recited and tabulated examples demonstrate compositions having iron as the metal used. Other active metals can be used, such as single or bimetal impregnated or exchanged on zeolites, and can include, for example: Fe, Cu, Ti, Co, Ni, Ag, Mn, Ce, La, Pt, Pd, Rh, or mixtures thereof. The pore structure can have a porosity of at least about 50% by volume, such as a porosity of from about 50 to about 70%, from about 50 to about 65%, and from about 55 to about 60%, including intermediate values and ranges. The median pore size can be, for example, at least or greater than about 3 micrometers, such as from about 5 to about 15 micrometers. The NOx conversion can be, for example, at least about 30%, and from about 70 to about 100%. The pressure drop at 5g/L soot load can be, for example, less than about 5 KiloPascal (Kpa), and from about 2.5 to about 4.5 Kpa in a 200/8 or a 300/8 geometry. Without soot loading (i.e., a clean pressure drop) the pressure drop is about 2 Kpa, such as from about 1 to about 2 Kpa.

In extruded catalyst filters (ECF), the zeolite nano-powder having a primary particle size of from about 10 nm to about 100 nm is dispersed throughout the filter body. Most of the nano-particles are on the surface of fillers. The pore connectivity can be improved by, for example, two or more pore formers that have different size and surface properties. The mixture of at least two pore formers can be, for example, a mixture having non-crosslinked starch particles and cross-linked starch particles that can be selected from, for example, cross-linked wheat starch (median particle size of about 20 micrometers), corn starch or cross-linked corn starch (about 15 micrometers), potato starch (about 40 to about 50 micrometers), bean starch (about 22 micrometers), and rice starch (about 6 micrometers). Other pore former combinations can be, for example, a cross-linked starch, a noncross-linked starch, a graphite, or a combination thereof. The median particle size of pore formers can be, for example, from about 1 micrometer to 90 micrometers, or from about 6 micrometers to about 50 micrometers. Without pore formers, the β-zeolite having about 30 wt % inorganic filler can have porosity of about 35 to about 40%. The median pore size can be, for example, less than about 0.5 micrometers. With pore formers, the porosity can be, for example, about 50 to about 70%, and the median pore size can be, for example, about 3 to about 10 micrometers depending on the volume percent of pore formers and the surface property of pore formers selected. By combining cross-linked starch and non-cross-linked starch, a desirable pore structure can be been achieved which provides a low pressure drop.

In embodiments, the present disclosure provides one or more of the following particularly useful features:

an adjustable pore structure, such as porosity, pore size distribution, and pore connectivity;

an ability to enlarge the pore size in a nano-material matrix (non-agglomerated nano-powder);

an ability to form large pores interconnected by interstices formed with multiple pore formers to make engine exhaust gas filter articles, such as catalyst diesel particulate filters (DPF);

a reduction in the number of process step (e.g., no spray dry prior to extrusion);

the catalyst diesel particle filters can have a lower pressure drop than currently available coated filters at comparable soot loading;

high NOx conversion (e.g., greater than about 70%) for porous filters (i.e., porosity>55% and median pore size greater than 3.0 microns);

low cost pore formers; and a scalable manufacturing process.

The disclosed filters provide excellent soot and NOx reduction properties. The disclosure provides compositions and methods to make catalyst engine exhaust gas filter articles, such as diesel particle filters (DPF) having highly connected micron-sized pores. The filters have a lower pressure drop than coated diesel particle filters at comparable soot loading.

Generally, a ceramic powder refers to the powders having micron sized particles or particle agglomerates. The pore connectivity of a porous body can be controlled by selecting comparably sized raw material (filler) and pore former particles, such as having a median particle size of from about 10 to about 30 micrometers. The low compaction of large particles can leave pores in body. Additional pore formers can create further porous connections between and among the pores. In embodiments of the present disclosure, depending on the particle size of raw materials and the ceramic powders selected, the porous body can have a porosity from about 30% to about 70%, and a median pore size from about 1 to about 3 micrometers and up to about 20 to about 30 micrometers for filter applications. For such filters, the pore connectivity generally can be very good if the porosity is greater than about 40% and if there is a relatively uniform pore distribution in the body.

However, for ceramic powders having nano-particle size (called nano-ceramic powders), the powder compaction is high, especially under pressure, such as in an extrusion process. Therefore almost no micron sized pores exist. The porosity of the porous body can vary depending on, for example, the powder processing of the nano-materials. Different powder processing can produce, for example, different crystalline size, and different primary particle size or different agglomerate size for a nano-material having the same crystal structure. For zeolite, the porosity can vary with the type of zeolite that is associated with the different powder processes. For instance, in β-zeolite CP814E, the primary particle size (less than about 50 nm) is smaller than for β-zeolite CP7119 (greater than about 500 nm). After forming a green body by extrusion at the same process condition without pore formers, the porosity of the β-zeolite CP814E formed body is higher than that of the CP7119 formed body, for example, 45% versus 36%. But the median pore size of the CP814E body is only about one-third of the CP7119 body, such as about 0.04 micrometers versus about 0.13 micrometers. The pores for both of these β-zeolites are formed due to inter-primary particles or inter-agglomerates. These pores are too small to be useful for particulate filtration. To make filter articles having useful pores for particulate filtration applications the inclusion of pore formers in the batch composition is particularly useful.

With the addition of pore formers, micron sized pores can be created after the pore formers are burned out by firing. The pore shape is directly related to the shape of pore former mixed into the nano-material matrix. The graphite pore former forms sheet-like pores, which pores are less useful in filtration applications. The starches have a more rounded shape although they are not spherical. The starches are better pore formers for the nano-ceramic matrix. Five starches which have been used in making the disclosed nano-zeolite filters, include, for example: rice starch, corn starch, cross-linked corn-starch, cross-linked wheat starch, and potato starch. Rice starch has a median particle size of about 6 to about 7 micrometers. Corn starch (or cross-linked corn-starch) has median particle size of about 15 micrometers. Potato starch has a median particle size of about 45 to about 50 micrometers. The wheat starch is a cross-linked starch having a median particle size of about 18 to about 20 micrometers. The cross-linking can be produced by, for example, reaction with phosphorus oxychloride, such as $POCl_3$, at a concentration of about 0.005 to about 0.2% (see for example, "Starch: Chemistry and Technology," J. N. BeMiller, et al.). The cross-linked wheat starch has lower hot water solubility because the cross-links tend to strengthen the granules against excess swell. Swell resistance can be a desirable property for certain pore formers in ceramic extrusion.

In embodiments, the porosity and pore size properties of the fired article have been controlled by using different types of starches that provide different particle size and have different surface properties to resist swell in water. Generally, a bigger starch particle size leaves a bigger pore in the nano-matrix. The cross-linked starch particles possess a surface that can resist a shape change during extrusion and can also help to avoid cracks during firing. At a constant volume in a batch, the cross-linked starch particles can usually produce higher porosity compared to noncross-linked starch. For the same median particle size of starch, the pore size is also larger for the cross-linked starch. Lower porosity and smaller pore sizes are typically obtained using natural starch because of deformation and swelling during, for example, the filter manufacture process, including extrusion, drying, and firing. However, combining natural starch and cross-linked starch can produce desired balanced porosity and pore size properties. For instance, a pure cross-linked starch gives high porosity and relatively larger pore sizes. However, the fired strength can be weak at such high porosities of, for example, about 60% to about 65%, or above. If combined with a natural starch that has the same particle size and keeping the total starch volume in the batch constant, the porosity can be lower, and the pore size has little or no change, which makes the fired filter stronger and provides a pore structure having a lower pressure drop.

The batch formulation can be based on the weight percentage of ingredients. However, the volume percentage of ingredients can provide an alternative metric for predicting porosity after firing. For nano-materials, such as zeolite, that have an open channel structure and often contain water; the powder specific density is about 2.0 g/cc (e.g., from about 2.0 to about 2.3 g/cc), which is considered to be a relatively low density material. To generate significant porosity, the pore formers should be present at certain minimums. The volume percentage can be estimated based on the material packing density (such as the tap density) in the green state. Table 1 lists the tap density and the median particle size of some materials used in the experimental Examples. The zeolite has very low tap density, which means it will have high volume ratio. In embodiments, to prepare a filter article having a 50 vol % porosity or larger for a pure (i.e., no inorganic fillers) zeolite batch the pore formers can be present, for example, in an amount of at least about 50 wt % where the starch pore formers have a greater tap density than zeolite. If a batch contains an inorganic filler, then more inorganic fillers can be added, and lesser amounts of the pore formers can be used since most inorganic fillers have a higher tap density than zeolite as shown in Table 1.

TABLE 1

Tap density and median particle size ($D_{50}$) of raw materials.

| Raw Materials | Tap Density (g/cc) | Median Particle Size (micrometers) |
|---|---|---|
| Zeolite CP 814E | 0.250 | nanoparticles |
| Zeolite CP7119 | 0.453 | nanoparticles |
| Wheat Starch Fine | 0.792 | about 15 |
| Wheat Starch Coarse | 0.690 | about 18 |
| Corn Starch | 0.814 | about 15 |
| Potato Starch | 0.724 | about 50 |
| Alumina A16SG | 1.303 | <1.0 |
| Talc Coarse | 1.318 | about 32 |
| Crystalline Silica Coarse | 1.260 | 13 to 17 |
| Fused Silica Coarse | 1.260 | 14 to 19 |

The inorganic fillers can have a similar size to the pore formers to achieve minimum powder compaction, and to form three-dimensional networks by the fillers. The inorganic filler can have two functions: 1) to control the physical properties of the fired filter article, such as thermal expansion, thermal mass, strength, and catalyst activity; and 2) to form a frame work in the porous zeolite body. In general, the greater the inorganic filler content, the lower the catalyst activity of the filter article. Thus, the zeolite content should be large enough to provide adequate NOx conversion. Depending on the physical properties of inorganic fillers, the selection of fillers can broad. Some fillers can even be very dense materials that have less volume ratio. Some fillers can have high heat capacity to increase the thermal mass of the catalytic filter. Some fillers can have high thermal or electrical conductivity to increase thermal diffusivity of the catalytic filter. In an especially useful facet of the disclosure the batch compositions can be formulated with a filler having particle sizes that are comparable to the particle size of the pore formers, for example, a median particle size of from about 10 to about 30 micrometers. The fillers can include, for example, inorganic metal oxides, such as alumina, silica, talc, mullite, titanium oxide, ceria, zirconia, zirconia, cordierite titania, and like materials, or combinations thereof (see also the abovementioned U.S. Ser. No. 12/275,568 (US2009/0143221)). Some fillers may also enhance the catalytic performance of the resulting body for soot and NOx reduction. The filler content can be, for example, from about 20 wt % to about 80 wt %, or about 10 to about 70 vol % including intermediate values and ranges.

After fixing the amount of fillers in the batch, the expected porosity and pore size can be determined by the amount of pore formers placed in the batch. At low filler content (e.g., 10 to 30 wt % based on 100 wt % of combined filler and nano-zeolite addition), if the pore former content is also low (e.g., less than 30 wt % by super addition), then most micron sized pores are isolated (i.e., unconnected). The pore distribution has little change compared to the compositions without pore formers, because the intrudable pores (by mercury porosimetry) can be blocked by the nano-zeolite. With increased pore former content (30 to 50 wt % by super addition), the porosity and pore size both increase because the micron pores begin to connect-up; but pore size is still in the smaller size range, such as less than about 2.0 micrometers. With a further increase of the pore former content (e.g., 50-100 wt % by super addition) the porosity correspondingly increases, and the connectivity between or among the micron pores becomes even greater. The median pore size can vary with the type of pore formers and size of pore formers selected. For high content filler batches, the pore former content can be decreased correspondingly to achieve the same porosity and pore size. The more filler that is added to the batch, the less pore former that will be needed to be added to achieve a pore structure having a low pressure drop. When the filler types and filler content are fixed in a batch, the cross-linked starches produce higher porosity and larger pore size compared to the non-crosslinked starch. By combining, for example, a cross-linked starch and a non-cross-linked starch, one can produce a ceramic filter article having a pore structure that has a strong porous body and a low pressure drop property.

EXAMPLES

The following examples serve to more fully describe the manner of using the above-described disclosure, as well as to set forth the best modes contemplated for carrying out various aspects of the disclosure. It is understood that these examples do not limit the scope of this disclosure, but rather are presented for illustrative purposes.

The working examples further describe how to prepare the porous articles of the disclosure.

Preparation of a green body A green body can be prepared according to U.S. Pat. No. 5,332,703, entitled "Batch compositions for cordierite ceramics," and U.S. Pat. No. 6,221,308, entitled "Method of Making Fired Bodies," both assigned to Corning Incorporated, and as modified according to the present disclosure.

Example 1

Figure 1B:
Figure 1C:

Table 2 shows a comparison of pore structure in fired filter articles for three different starches. All batches contain the same active zeolite (60 wt % in batch), and other components are also the same, including 40 wt % talc as filler, and super additives of 20 wt % graphite pore former, 40% silicone emulsion as inorganic binder, 10% organic binder, and 6% iron gluconate as NOx conversion catalyst. The starch content in each batch was 80 wt % by super addition. Both corn starch and potato starch are non-cross-linked, wheat starch is cross-linked. FIGS. 1A to 1C shows SEM images of microstructures of exemplary zeolite filter articles prepared with different the starch pore formers: FIG. 1A corn starch; FIG. 1B potato starch; and FIG. 1C cross-linked wheat starch. The results show that cross-linked starch produces the largest median pore size (by mercury intrusion). Although potato starch particles are larger and resulted in larger pores than those produced by wheat starch as shown in FIG. 1B, these large pores are connected by narrow openings or passages. These connected large pores having intrudable small pores result in a smaller median pore size compared to the pores from the wheat starch formulation as shown in Table 2.

TABLE 2

Properties for the zeolite filters prepared with a single but different starch type.

| 80% Starch Type | Pore Former Particle Size @d$_{50}$ (microns) | SA | Porosity (%) | Pore Size (MPS) | Max NOx conversion (after aging) | Filter density (g/cc) | Zeolite Load (g/L) | Comments |
|---|---|---|---|---|---|---|---|---|
| Corn | 15 | 295 | 54.2 | 0.93 | 94.0% | 0.280 | 134 | Considerable shrinkage on firing |
| Potato | 48 | 300 | 64.6 | 2.26 | 94.5% | 0.252 | 121 | Pores 20-30 microns, but not highly connected |
| Wheat | 20 | 298 | 62.8 | 3.63 | 96.0% | 0.228 | 104 | Relatively high permeability |

1. SA (m$^2$/g) is the surface area measured by BET (nitrogen adsorption) method in square meters per gram.
2. MPS is the median pore size (d$_{50}$) in micrometers.

Corn starch produces lower porosity and smaller pore size because of the high shrinkage after firing. The SEM images show that most pores are isolated when using corn starch as a pore former (FIG. 1A). The significant low pore volume suggests that some corn starch particles were burned out without leaving voids so that shrinkage occurred. This example suggests that the surface property plays a role in total pore volume as well as the pore connectivity in nano-materials porous body. The cross-linked starch is desirable for preparing nano-zeolite catalyst filters. The filters prepared with wheat starch not only have the highest porosity and pore size, but also have better pore connectivity characterized by permeability and SEM images as shown in FIG. 1C. The NO$_X$ conversion is high as well. All filters have excellent NO conversion, such as greater than about 94%. The nano-zeolite loading can be, for example, about 60 wt % in the batch or about 50 wt % in the fired porous catalyst body. All NO conversions were measured for after aging the filter articles at 700° C. for 64 hours in 10% water vapor. The fresh fired catalyst filters usually have better NO$_x$ conversion. The aged condition is intended to simulate application or use conditions.

Example 2

Influence of mixed pore formers on pore structure and filter properties The following examples demonstrate the impact of mixed starches on pore structure and fired filter properties or fired filter articles. Each batch contained 30% zeolite CP7119, and 70% fused silica as filler. The total starch was 60 wt % but having different type permutations.

Figure 2:
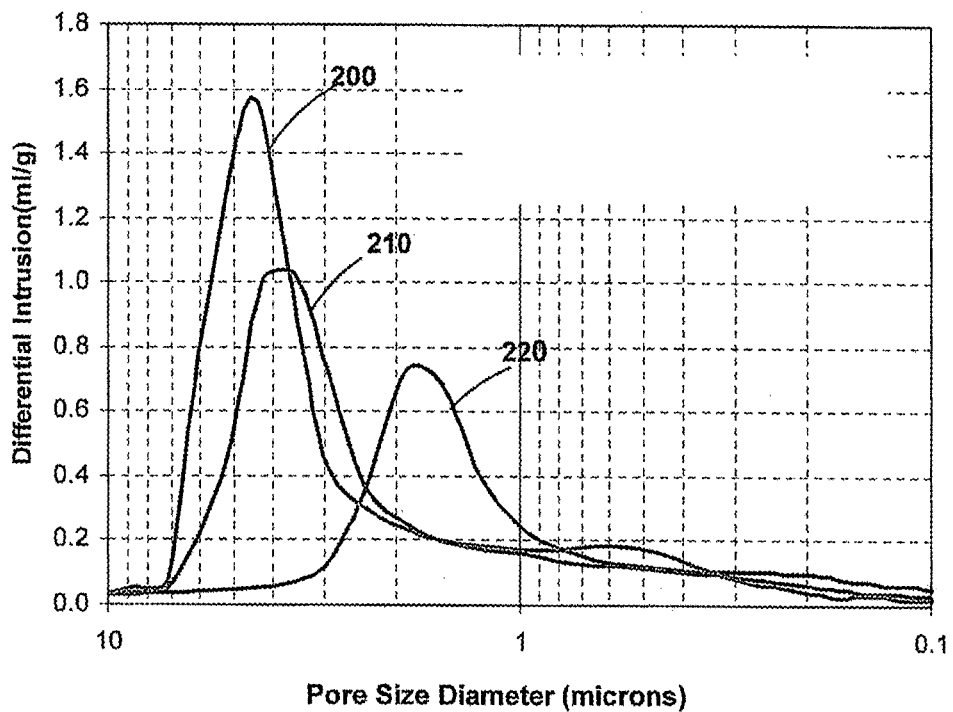
FIG. 2 shows pore size distributions of extruded catalyst filter (ECF) articles prepared with selected pore formers.

The first batch (I) contained only corn starch, the third batch (III) contained only cross-linked wheat starch, and the second batch (II) contained both cross-linked wheat starch and corn starch. The porosity increases as wheat starch content increases, as does the median pore size as shown in Table 3. The results indicate that the porosity and pore size of the fired filter article can be adjusted by combining two different types of starch. FIG. 2 shows the pore size distribution of ECF articles prepared with three different pore formers compositions. As the wheat starch content increases, the pore size distribution shifts to the larger pore sizes as shown in FIG. 2. With a quantity of corn starch (20%) and wheat starch (40%) (210), the porosity and pore size are reduced slightly, but much greater than the wheat starch (60%) alone (200) or the third batch (III). By using mixed or multiple starch pore formers the pore structures can be controlled to provide fired filter articles having, for example, superior pore connectivity, lower pressure drop (lower back pressure), and stronger porous bodies. The NOx conversion is also enhanced in the filter obtained from the second batch (II) (210) and has a pore former level similar to the first batch (I) (220) made filter that contained only corn starch (60%). The NOx conversion in this series of samples was low, which is believed to be attributable to the batches having 1% sodium stearate. The sodium can be detrimental to zeolite activity if the firing temperature or the use temperature exceeds 800° C. Thus, minimizing sodium ions or any alkaline ions in the zeolite filter composition, such as below about several hundred parts per million, and avoiding high or extending heating, can be beneficial to filter performance.

TABLE 3

Properties of ECF articles prepared with different pore formers at a zeolite content of 30 wt %.

| Batch | Corn Starch (wt %) | Wheat Starch (wt %) | Zeolite Load (g/L) | SA (m$^2$/g) | Porosity | MPS (microns) | NOx conversion (after aging) |
|---|---|---|---|---|---|---|---|
| I (220) | 60 | 0 | 74 | 174 | 49.7% | 1.61 | Maximum is 74.5% |
| II (210) | 20 | 40 | 84 | 174 | 54.6% | 3.08 | Maximum is 70% |
| III (200) | 0 | 60 | 70 | 186 | 57.9% | 3.81 | Maximum is 59% |

Example 3

Figure 3:
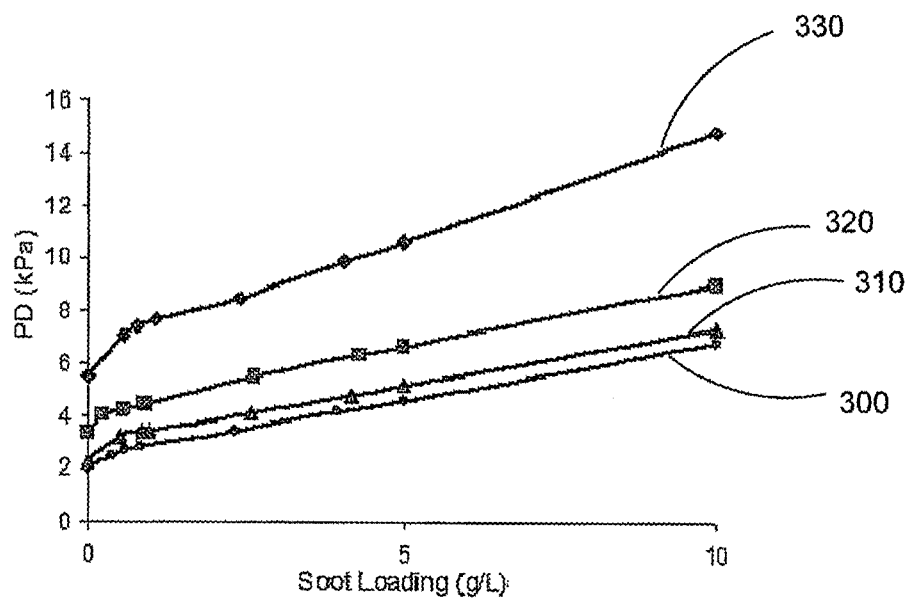
FIG. 3 shows pressure drop properties of selected ECF articles and a comparative filter article, with and without soot loading.

Pressure drop related to starch selection or starch combination. The following examples show the pressure drop of ECF with a single starch or mixed starch pore former. The pressure drop can be sensitive to the pore structure, especially pore connectivity, and can also be a function of honeycomb cell configuration, such as cell density and web thickness. Table 4 lists information for three samples that have low pressure drop. Compared to the coated cordierite, the disclosed zeolite filters have a lower pressure drop at soot loading even if the pore size is only in the range of about 3 to about 6 micrometers as shown in FIG. 3. FIG. 3 shows the pressure drop properties of several ECF articles (300, 310, 320) and a comparative coated cordierite filter (330) at a flow rate of 8.35 fcm/cm². The comparative coated cordierite filter is cordierite having a 50 g/L β-zeolite coating. The pressure drop for the comparative coated cordierite filter is significantly higher than that of ECF. The ECF articles have low pressure drop and high filtration efficiency since they haves small pores. The initial filtration efficiency (FE) at beginning of a simulation (i.e., having zero cumulative soot loading) was greater than about 95% for both 200/12 and 300/8 ECF articles. The subsequent filtration efficiency was greater than about 95%, such as about 96 to 99% for both 200/12 and 300/8 ECF articles over a broad range of soot loading (e.g., 0.01 to 0.06 g/L). The high clean (i.e., zero soot or soot free) pressure is attributed to the small pore sizes in the ECF. The filter made with the thin web (8 micrometers for Formulation D in Table 5) has a lower pressure drop than the thick web (12 micrometers from CR115). Thus, in embodiments, the thin web filter can be a very favorable configuration for ECF. It has been demonstrated that the larger pore size and higher porosity compositions have superior low pressure drop compared to the comparative coated cordierite compositions. Filter articles having a median pore size of from about 5 to about 10 micrometers are particularly useful. The increased pore size will lower the clean pressure drop. These examples show the impact of pore former compositions on pressure drop. Composition 320 (F) contains talc as filler. The compositions, 310 (D) and 300 (J), contain silica as filler. Composition formulations F, D, and J are summarized in Table 5. Zeolite Load (g/L) refers to the grams of zeolite to the total filter volume of the ceramic article and MPS is defined above.

Example 4

Table 5 lists exemplary batch compositions that provide a fired article having a porous structure having a low pressure drop and good NOx conversion. Some compositions have been illustrated in the above examples (i.e., 310=Formulation D, 320=Formulation F, 300=Formulation J). The zeolite and filler comprised the total inorganic content and was equal to 100 wt % in the batch calculation. All other components are super-additions. The amount of starch pore former in the batch is provided as a super-addition weight percentage of the total weight of zeolite and filler (100 wt %). Comparative formulation examples G and I that were prepared with a single pore former provided ceramic filter articles having poorer pore connectivity compared to those articles prepared with at least two pore formers (i.e., A-F, H, J, and K).

The disclosure has been described with reference to various specific embodiments and techniques. However, it should be understood that many variations and modifications are possible while remaining within the scope of the disclosure.

TABLE 4

Filter pressure drop data for selected batch compositions.

| Composition FIG. 3 | Zeolite (CP7 119) (wt %) | Zeolite Load (g/L) | Pore former (super add wt %) | Filter Geometry | Max NOx Conversion (wt %) | SA (m²/g) | Porosity | MPS | Permeability (Darcy Constant) | Filter Density (g/cc) |
|---|---|---|---|---|---|---|---|---|---|---|
| F (320) | 40 | 83 | 80 wheat | 200/12 | 80 | 203 | 66.7% | 4.37 | 0.101 | 0.287 |
| D (310) | 50 | 85 | 80 Potato | 300/8 | 90 | 224 | 61.0% | 3.91 | 0.085 | 0.231 |
| J (300) | 30 | 54 | 40 Corn, 50 Wheat | 300/8 | 74 | 177 | 59.5% | 5.51 | 0.201 | 0.252 |
| Control (330) | Coated Cordierite | 50 | — | 200/12 | 82 | 120 | 59% | 23.5 | n/a | 0.34 |

TABLE 5

ECF compositions: Batch Compositions (wt %)

| | Ingredients | A | B | C | D | E | F | G comparative | H | I comparative | J | K |
|---|---|---|---|---|---|---|---|---|---|---|---|---|
| Inorganics | Zeolite | 60% | 60% | 60% | 50% | 50% | 40% | 30% | 30% | 30% | 30% | 20% |
| | Filler | 40% | 40% | 40% | 50% | 50% | 60% | 70% | 70% | 70% | 70% | 80% |
| | Total Base Inorganic Components | 100% | 100% | 100% | 100% | 100% | 100% | 100% | 100% | 100% | 100% | 100% |
| Catalyst | Fe Gluconate | 6% | 6% | 6% | 6% | 3% | 6% | 6% | 3% | 3% | 2% | 6% |
| Pore Formers | Potato Starch | 80% | | | 80% | | 80% | | | | | |
| | Corn Starch | | 80% | | | | | 60% | 20% | | | |
| | Corn Starch (Cross-linked) | | | | | 40% | | | | | 40% | |
| | Wheat Starch (Cross-linked) | | | 80% | | 50% | | | 40% | 60% | 50% | 60% |
| | Graphite | 20% | 20% | 20% | 10% | | 20% | | | | | 10% |
| Binders and Organics | Organic Binder Methocel | 10% | 10% | 10% | 10% | 10% | 10% | 10% | 10% | 10% | 10% | 10% |
| | Inorganic Binder, M97E, silicone emulsion | 40% | 40% | 40% | 50% | 50% | 50% | 50% | 50% | 50% | 50% | 50% |
| | Dyrasyn ink | 5% | 5% | 5% | 5% | 5% | 5% | 5% | 5% | 5% | 5% | 5% |
| | Tall oil | 5% | 2% | 2% | 2% | 2% | 2% | 2% | 2% | 2% | 2% | 2% |
| | Water | 43% | 43% | 43% | 37% | 36% | 38% | 26% | 22% | 20% | 27% | 30% |

ECF compositions (continued): After Firing, Filter Composition (normalized, wt %)

| Ingredients | A | B | C | D | E | F | G | H | I | J | K |
|---|---|---|---|---|---|---|---|---|---|---|---|
| Zeolite | 51.29% | 51.29% | 51.29% | 41.33% | 41.50% | 33.06% | 24.80% | 24.90% | 24.90% | 24.90% | 16.53% |
| Fillers | 34.19% | 34.19% | 34.19% | 41.33% | 49.50% | 49.59% | 57.86% | 58.10% | 58.10% | 58.20% | 66.12% |
| $Fe_2O_3$ | 0.84% | 0.84% | 0.84% | 0.81% | 0.41% | 0.85% | 0.81% | 0.41% | 0.41% | 0.27% | 0.81% |
| $SiO_2$ from silicone emulsion | 13.68% | 13.68% | 13.68% | 16.53% | 16.60% | 16.53% | 16.53% | 16.60% | 10.60% | 16.60% | 16.53% |
| Total weight | 100.0% | 100.0% | 100.0% | 100.0% | 100.0% | 100.0% | 100.0% | 100.0% | 100.0% | 100.0% | 100.0% |

What is claimed is:

1. An extruded and fired honeycomb catalyst filter article comprising:
   15 to 55 wt % of a nano-zeolite having a primary particle size of from 10 to 100 nm;
   30 to 70 wt % a micron sized inorganic filler;
   0.25 to 0.90 wt % $Fe_2O_3$; and
   10 to 20 wt % $SiO_2$ from a silica source other than the inorganic filler, and the extruded and fired honeycomb catalyst filter article has:
   a rounded porosity of 50 to 70 wt %,
   a median pore size of from 3 to 8 microns,
   the nano-zeolite is on the surface of inorganic filler, and the nano-zeolite on the surface of inorganic filler is dispersed throughout the walls of the filter article and on the surface of the walls of the filter article, and
   the catalyst in the extruded and fired honeycomb catalyst filter article is an ion impregnated or metal ion exchanged zeolite.

2. The article of claim 1 wherein the pore size has a narrow distribution measured by $d_{breadth}$ of less than 1.5.

3. The article of claim 1 wherein the walls of the article have a minimum thickness of 8 mils.

4. A method for engine exhaust gas particulate control comprising:
   passing engine exhaust gas through an extruded and fired honeycomb catalyst filter article comprising:
   15 to 55 wt % of a nano-zeolite having a primary particle size of from 10 to 100 nm;
   30 to 70 wt % of a micron sized inorganic filler;
   0.25 to 0.90 wt % $Fe_2O_3$; and
   10 to 20 wt % $SiO_2$ from a silica source other than the inorganic filler, and the extruded and fired catalyst filter article has:
   a rounded porosity of 50 to 70 wt %,
   a median pore size is from 3 to 8 microns,
   the nano-zeolite is on the surface of inorganic filler, and the nano-zeolite on the surface of inorganic filler is dispersed throughout the walls of the filter article and on the surface of the walls of the filter article, and
   the catalyst in the extruded and fired honeycomb catalyst filter article is an ion impregnated or metal ion exchanged zeolite.

5. The method of claim 4 wherein the exhaust gas back pressure is less than 5 KPa at 5 g/L soot loading for an article having a 300/8 geometry and 8.35 cfm/in² flow rate.

6. The method of claim 4 wherein the NOx reduction is greater than 50%, and the permeability of the article is from 0.8 to 2.0.

* * * * *